United States Patent [19]

Webb

[11] 3,898,551
[45] Aug. 5, 1975

[54] AVERAGE VOLTAGE DETECTOR FOR NONLINEAR WAVEFORMS
[75] Inventor: Robert B. Webb, Turnersville, N.J.
[73] Assignee: The United States of America as represented by the Secretary of the Navy, Washington, D.C.
[22] Filed: May 2, 1974
[21] Appl. No.: 466,365

[52] U.S. Cl. .................. 322/28; 321/5; 321/10; 322/72; 322/DIG. 6
[51] Int. Cl.² ........................................... H02P 9/30
[58] Field of Search ............. 321/5, 10; 322/27, 28, 322/72, DIG. 6

[56] References Cited
UNITED STATES PATENTS

| | | | |
|---|---|---|---|
| 2,896,149 | 7/1959 | Lowry, Jr. et al. | 322/28 |
| 3,026,467 | 3/1962 | Barnes | 321/5 |
| 3,036,258 | 5/1962 | Friedrich | 321/5 |
| 3,134,068 | 5/1964 | Feltman | 321/5 |
| 3,290,579 | 12/1966 | Hausner | 321/5 |
| 3,308,265 | 3/1967 | Hobart | 321/10 |
| 3,711,760 | 1/1973 | Kaiser | 321/5 |
| 3,737,760 | 6/1973 | Kiwaki et al. | 322/28 |
| 3,818,319 | 6/1974 | Harrell et al. | 322/28 |

Primary Examiner—Gerald Goldberg
Attorney, Agent, or Firm—R. S. Sciascia; P. Schneider; W. Ellis

[57] ABSTRACT

A voltage regulator for use with non-linear loads comprising a 3 to a higher phase section-wound transformer for converting a 3 phase generator waveform to the higher phase, a full-wave rectifier for rectifying the higher phase output, a smoothing filter for removing the high harmonics and noise, a differential amplifier for comparing this smoothed and rectified waveform to a voltage reference, and an amplifier for amplifying the difference signal and applying it as an error signal to control the voltage-generated field.

10 Claims, 8 Drawing Figures

AVERAGE VOLTAGE DETECTOR FOR NONLINEAR WAVEFORMS

FIELD OF THE INVENTION

This invention is concerned generally with voltage regulator systems and in particular with voltage regulator systems for use with nonlinear loads.

BACKGROUND OF THE INVENTION

The inaccuracy of voltage-regulators when used with non-linear loads is a problem of long standing in the regulator art.

FIGS. 1 and 2 show typical, known, voltage regulators circuits.

FIGS. 3a to 3d are waveforms graphically illustrating operating conditions in the circuits of FIGS. 1 and 2 and are given to provide an understanding of the problems encountered in the operation of the circuits of FIGS. 1 and 2. In FIG. 1 three-phase 60 hertz input power is applied through the circuit breakers 13 to the motor 10 via lines 11. The motor is mechanically coupled to the generator 12. The generator 12 typically may produce a three-phase, 400 hertz output on the lines 15. This output signal of the generator 12 is detected and compared with a reference voltage in the block 14 in order to produce an error signal. This error signal is amplified by the amplifier 16 and then used to control a field winding 18 which controls the output voltage of generator 12.

FIG. 2 illustrates a common voltage regulator that is used with motor-generator systems. The elements 20 through 28 represent the detecting and comparing circuit 14 (FIG. 1). The elements 15, 16, and 18 correspond to the those numbered elements in FIG. 1.

The circuit of FIG. 2 operates as follows: The three-phase output signal from the generator appearing on lines 15 is applied to the delta connected transformer 20. The induced voltage developed in the Y-connected secondary 22 is applied to a full-wave rectifier circuit 24 which transforms this three-phase signal to a ripple signal with a frequency of six times the original generator output frequency. This ripple frequency is integrated by the capacitor 26 so that a smooth D.C. waveform is produced. This smooth D.C. waveform is compared to a reference voltage in the comparing circuit 28 and an error signal is applied to the amplfier 16 for amplification. This amplified signal is then applied to the windings 18 to control the generator 12 output voltage.

When the generator 12 is connected to a linear load (resistor, motor, etc.) a smooth sine wave (FIG. 3A) is generated and applied on the lines 15. This smooth sinewave is fullwave-rectified and then applied to the integrating capacitor 26, which discharges, thus converting this signal to a D.C. signal at the sinewave peak level for comparison in the comparing circuit 28.

Thus the sinewave peak is used to control the generator 12 output voltage.

Problems arise with this type of regulation in non-linear load applications. The types of non-linear loads of especial concern here are radar system applications. The transmitters in such radar applications draw the current signal periodically for their pulse transmissions. These pulse currents are inherently rich in harmonics. After such a harmonic-rich pulse is drawn from the generator by the transmitter load, certain of its harmonics are reflected from the load back along the line to the generator. Thus the voltage waveform is the sum of the positive-going generator output and these reflected-back harmonics. The resultant voltage waveform (determined by whether these two waveforms add to or cancel each other) depends on the relative phasing of the positive and reflected voltage components. The phasing of the reflection waveform depends on the reactance of the transmitter load circuitry from which these harmonics are reflected. Thus, depending on this phasing, the reflected harmonics either add to or subtract from the positive voltage component causing either voltage peaks or voltage truncations respectively.

FIG. 3a illustrates a typical, no-load waveform at 400 Hz (the same waveform as in a linear load). The voltage RMS for this waveform is 440V. FIG. 3b shows the waveform under a small-load condition (9KW). As can be seen from the drawing, the voltage peaks are truncated thus indicating positive component-reflection component cancelation. In a standard regulator system, after rectification this waveform is integrated only up to these truncated peaks. Thus the D.C. signal level applied to the comparing circuit 28 is low relative to the reference voltage and relative to the actual voltage produced by the generator. This circuit then applies an error signal which is applied to the control windings 18. Thus the voltage generated by the generator 12 (FIG. 1) is increased. The voltage in FIG. 3b is increased to 449 V RMS due to this regulator error signal even though there was no error in the original voltage generated.

FIG. 3c shows the resulting voltage waveform under a full load (50 KW in this instance). With this load the relative phasing of the 400 Hz positive waveform and the reflective signal is such that the voltage components add and the voltage peaks of the waveform are increased. In the standard regulator system of FIG. 2, after rectification this waveform would be integrated up to this higher peak level. Thus the D.C. signal level applied to the comparing circuit 28 is high relative to the reference voltage and relative to the voltage actually produced by the generator. The circuit 28 then generates an error signal and applies it to the control windings 18 to decrease the generator 12 (FIG. 1) voltage output. The voltage in FIG. 3c is thus decreased to 432 V RMS due to this regulator error signal even though there was no error in the original voltage generated.

This type of voltage regulator error is unacceptable in radar transmitter systems. Such generator voltage variation causes the amplitude of the transmitted pulse to vary. The variation of this transmitted pulsed limits the possible range of the system (if the pulse energy is too low) and causes error in the range determination generally. Also the life of the regulator section is degraded due to the operation of its components at voltages out of their specified ranges.

This problem is further aggravated by the layer-wound transformer generally used in standard voltage regulators. This type of transformer inherently has energy storage. The capacitive discharge of this transformer's energy storage further adds to the D.C. voltage level distortion caused by the integration from the capacitor 26.

Furthermore, the layer-wound transformers generally used to pick up the signal in a conventional regulator are inaccurate to a certain degree. This is due to manufacturing differences between the primary windings or the secondary windings. For example the number of turns might be slightly different or the winding tensions might be different. Such winding differences in the transformer result in an uneven signal detection. Thus, for example, if one secondary had 1001 turns while the other two secondaries had 1000 turns, the waveform after full wave rectification would look approximately like that shown in FIG. 3d. The large humps 27 in the waveform represent the 1001 turn secondary. The integrating capacitor 26 along with the capacitive storage in the transformer secondary 22 (by their capacitive discharge) act to raise the waveform voltage level to approximately the height of the 1001 turn secondary output. This level is illustrated by the dashed line 30 in FIG. 3d. These transformer manufacturing differences cause the D.C. voltage level to increase, thus further adding to the voltage regulation error.

In search radar systems, this non-linear load is generally static (fixed). Thus during 98 percent of the operation the load is constant and only during 2 percent of the operation does this load vary (no load to full load). In this type of system the regulator error may be compensated for. One method of compensation would comprise merely altering the reference voltage which is compared to the D.C. voltage signal from the generator. Of course this would have to be done on an individual basis with each load used with the generator. Since the transformer and circuitry peculiarities in each regulator must be taken into account in the compensation, there can be no interchange of regulator components after this compensation. Thus the requirement that each load-regulator combination be compensated for individually makes for a time-consuming and expensive process.

In guidance radar systems the load characteristic changes dynamically depending on the target range. Thus the harmonic phasing varies dynamically and there is no stable point from which the generator may be compensated. In view of this fact, a compensation technique would be unacceptable in such systems.

This voltage regulator error is a problem of longstanding in the guidance radar art.

SUMMARY OF THE INVENTION

The before-mentioned problems arising in voltage regulation due to the connection of a non-linear load to the voltage generator are obviated in the present invention by: 1. Removing the need for waveform integration; 2. Removing all energy storage devices that might discharge to effect an integration.

Specifically, a 3-to-6 or higher transformer phase conversion is used to provide a ripple frequency of twelve times the fundamental frequency and a non-energy storage smoothing filter is used to remove the ripple thus providing a D.C. waveform. The transformers used are section-wound transformers which have a minimal amount of energy storage capacity and are extremely accurate (minimal manufacturing difference between windings).

OBJECTS OF THE INVENTION

An object of the present invention is to remove the voltage regulator error caused by non-linear loads.

A further object is to enable a voltage regulator to detect the average voltage as opposed to the peak voltage in a non-linear load system.

A still further object of the present invention is to remove the waveform integration requirement in voltage regulators.

A still further object is to avoid problems in a voltage regulator system.

DETAILED DESCRIPTION OF THE INVENTION

Figure 1:
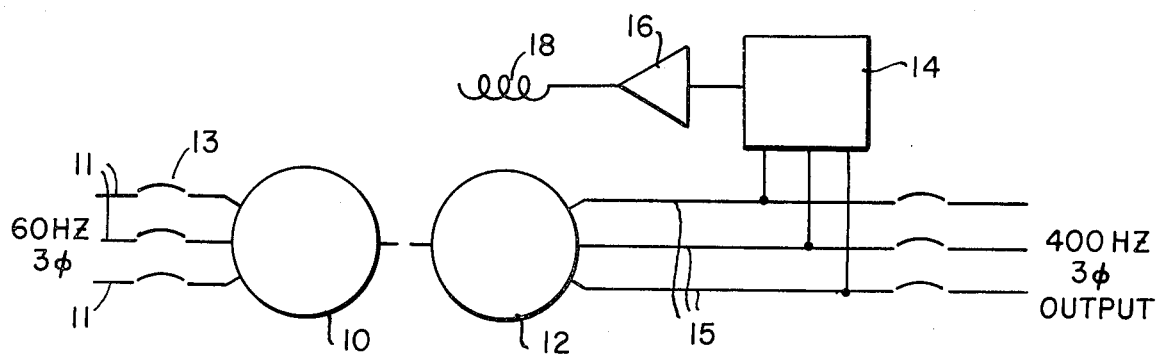
FIG. 1 illustrates a typical motor-generator system.
Figure 2:
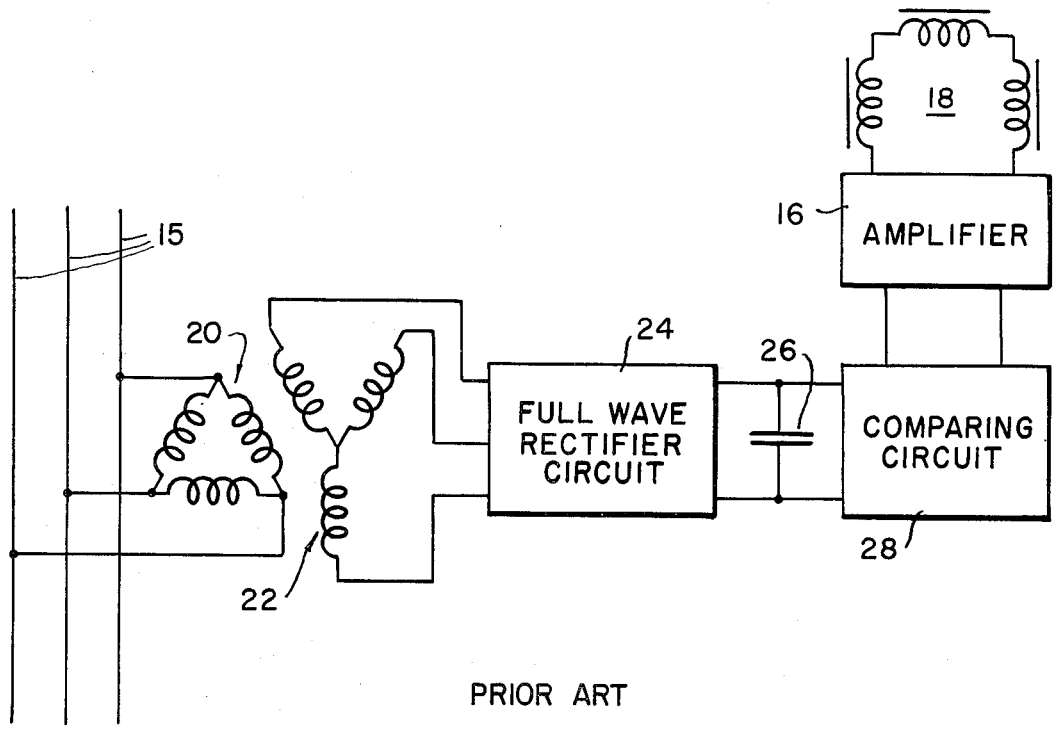
FIG. 2 is a conventional voltage regulator system.
Figure 4:
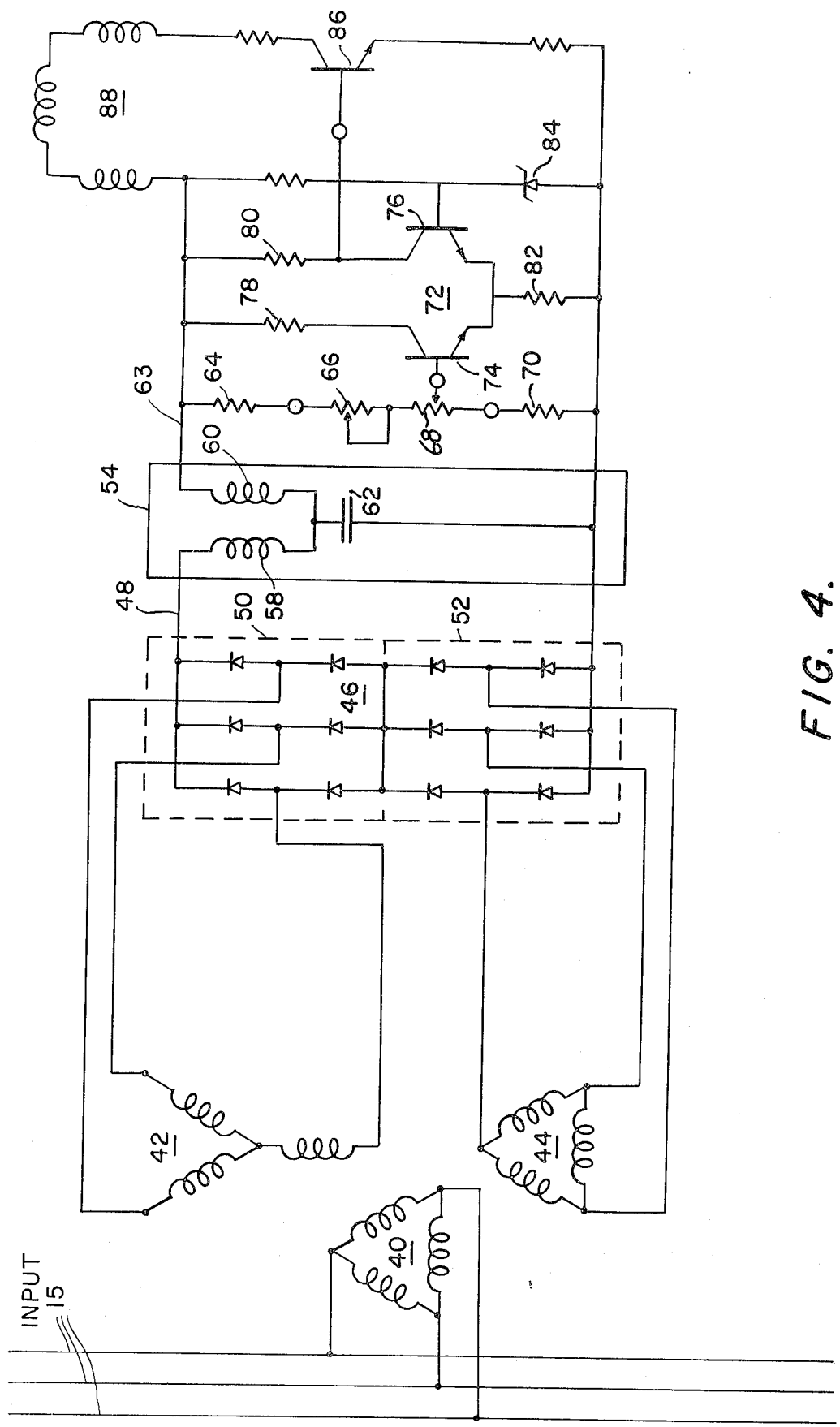
FIG. 4 is a schematic diagram of an embodiment of the present invention.

Referring to FIG. 4 the three-phase output from the voltage generator 12 (FIG. 1) is taken from the lines 15 and applied to a delta-connected transformer $T_1$ having a primary 40. In order to obviate the need for integration a 3 to 6 phase conversion is used. To effect this conversion, two secondary windings 42 and 44 are used with the primary 40 in the transformer $T_1$. The secondary winding 42 is Y-connected, while the secondary winding 44 is delta-connected. The outputs from these secondary windings are added in a six-phase, fullwave rectifier 46 to give a ripple frequency waveform of twelve-times the input frequency on the rectifier 46 output line 48. It is to be understood that this invention is not restricted to the use of a delta to delta-Y transformer configuration. Any type of winding configuration that provides a six-pointed star output may be used here. This 3 to 6 phase conversion also provides a better statistical sample of the waveform in a 360° period.

The rectifier 46 comprises a set of 12 diodes formed into two, 6-diode, three-phase, fullwave rectifiers 50 and 52 connected in series with each other.

Figure 3C:
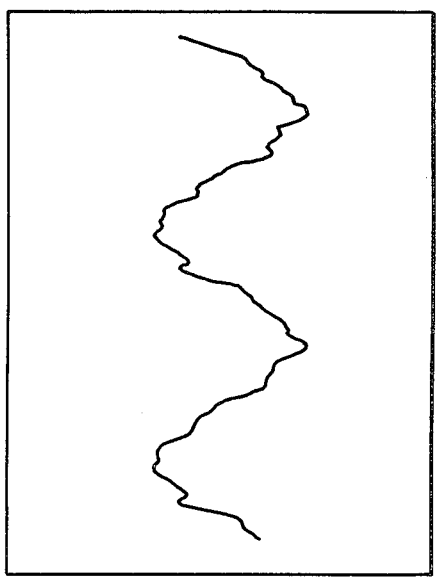
FIG. 3c is an illustration of a generator waveform under a full-load condition.
Figure 3B:
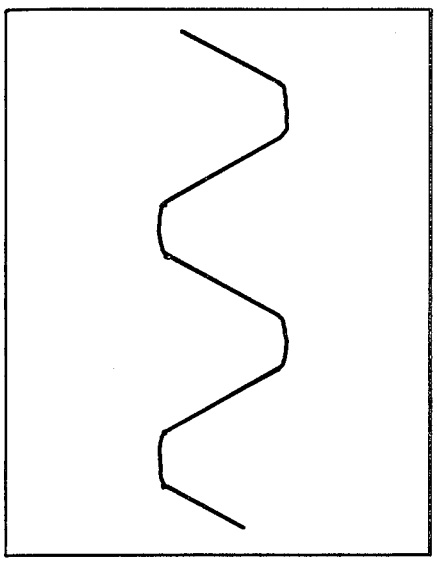
FIG. 3b is an illustration of a generator waveform under a small-load condition.
Figure 3A:
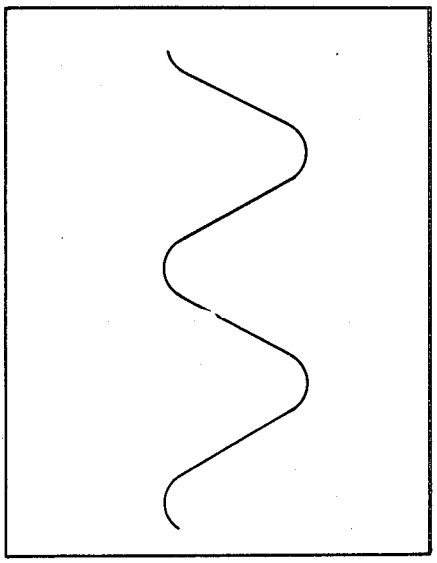
FIG. 3a is an illustration of linear load or no load waveform.
Figure 3E:
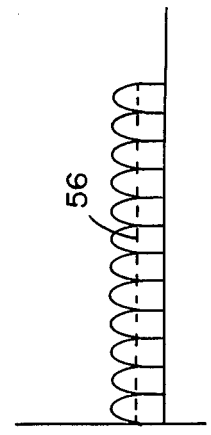
FIG. 3e is an illustration of a voltage waveform after a 3-to-6 phase conversion, rectification and smoothing.
Figure 3D:
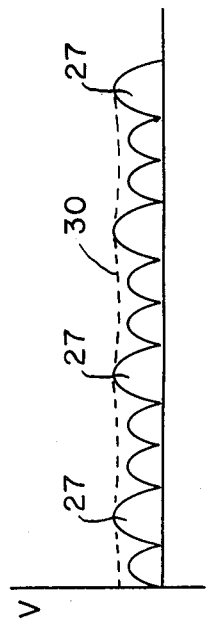
FIG. 3d is an illustrating of an inaccurate transformer-induced voltage waveform.

After recitification, the signal is a ripple frequency of twelve times the initial generator 12 input frequency. This ripple has a peak-to-peak variation of only 5 percent of the peak value. Thus the voltage is never less than 95 percent of the peak value. In the conventional systems, a fullwave recitifed 3-phase waveform has an excursion to 82 percent of its peak value while a fullwave-rectified single-phase waveform has an excursion to zero voltage. Thus both single and three-phase systems require waveform integration before a D.C. a signal may be obtained. FIG. 3e is an example of a possible ripple frequency. This signal is applied on line 48 to a smoothing filter 54. The purpose of this filter 54 is to remove the ripple from the waveform shown in FIG. 3e by filtering out the high frequency harmonics and noise. The new signal level after after passing through this filter is shown as the dotted line 56 in FIG. 3e. The ripple filter may be adjusted so that this new level 56 coincides approximately with the true average voltage of the waveform. Thus the peaks and truncations are no longer taken into account when the D.C. level is being formed.

Any type of non-energy-storing filter with a high cutoff frequency may be used for the filter 54. The filter shown is a low-pass filter comprising a capacitor 62 in shunt with line 48 and two series-connected inductors 58 and 60. This low-pass filter is used in a resonant mode (the energy oscillates back and forth within the filter) so that there is no integration of the waveform through an energy discharge.

The signal on line 63 is now a D.C. signal. This D.C. signal is divided down to an appropriate level by the resistors 64, 66, 68, and 70. This divided D.C. signal is then applied to a differential amplifier 72 comprising the two transistors 74 and 76, and the three resistors 78, 80, and 82. This differential amplifier 72 compares this divided D.C. signal with a constant reference voltage which is applied to the base of the transistor 76 by the zener diode 84.

The output of the differential amplifier 72 is applied to the base of a driver transistor 86 (amplifier) to control the current flowing in this transistor. This current in transistor 86 is the error current which is applied to the windings of the magnetic amplifier 88 to control the field of the generator 12. The transistor 86 essentially acts as a gate to the error current, with the differential amplifier 72 output voltage acting to bias the base of this transistor 86 to increase or decrease the error current through this gate.

Thus with the above-described circuitry the requirement of waveform integration is eliminated. But even though the integrating-capacitor circuitry is eliminated, there will still be distortion due to capacitive discharges from the inherent energy storage in the transformer windings. These sources of distortion are eliminated by the use of a section-wound transformer for T₁. Section winding consists of first winding two primary sections on the core, then winding the secondary windings on the core over them, and then winding two more primary windings on top of these secondary windings. The interleaving of the windings in this fashion substantially reduces capacitive coupling between the sections. This is an expensive process, but it leads to very accurate transformer characteristics and practically eliminates energy storage within the transformer itself. A section-wound transformer that may be used here is the RCA XT13543 transformer.

Thus due to the removal of all energy-storing devices from the circuit (integrating capacitor, replacing the transformer with a section-wound transformer), the generator may ignore the nonlinearity of the load.

It should be noted here that although the waveform integration was obviated by using a 3 to 6 phase conversion, a conversion to phase greater than 6 phase may be used in its place. A 3 to 6 phase conversion was used here because it is the least expensive and it is the easiest to implement circuit-wise.

Obviously, many modifications and variations of the present invention are possible in light of the above teachings. It is therefore to be understood that, within the scope of the appended claims, the invention may be practiced otherwise than as specifically descirbed.

What is claimed is:

1. A voltage regulator system for a voltage generator providing a 3-phase output comprising:
   first means for converting said 3-phase output to a waveform of a higher phase;
   rectifier means coupled to receive and rectify said higher-phase waveform;
   filter means coupled to the output of said rectifier means with a high cutoff frequency for filtering out high frequencies and noise, said filter means having a minimal voltage discharge during its operation;
   comparing means coupled to said filter means for providing an error signal representative of the difference between the filtered signal and a reference voltage; and
   second means responsive to said error signal for controlling said voltage generator.

2. A voltage regulator as in claim 1, wherein said first means is a section-wound transformer, said rectifier means is a full-wave rectifier, and said
   second means includes a winding for affecting the field of said generator.

3. A voltage regulator as in claim 2 wherein said transformer means is a 3-to 6-phase transformer with a delta-connected primary and delta-and Y-connected secondaries.

4. A voltage regulator as in claim 3, wherein said full-wave rectifier means comprises two 3-phase diode bridges connected in series to effect a 6-phase fullwave rectification.

5. A voltage regulator as in claim 2, wherein said filter means comprises two inductors connected in series with respect to each other and with respect to said full-wave rectifier means; and a capacitor connected in shunt across said rectifier means outputs and with one terminal connected at the point between said two inductors, the values of said inductors and capacitor being chosen so that said filter means operates in a resonant mode at the frequency of interest.

6. A voltage regulator as in claim 2, wherein said comparing means is a differential amplifier.

7. A voltage regulator as in claim 6, wherein said comparing means further comprises amplifying means for amplifying the difference signal from said differential amplifier.

8. A voltage regulator as in claim 7, wherein said amplifying means is a transistor with its base connected to the output from said differential amplifier.

9. A method for accurately regulating the three-phase A.C. voltage of a circuit under a nonlinear load comprising the steps of:
   sampling said three-phase A.C. voltage;
   converting said sampled voltage to a waveform with a higher phase;
   rectifying said higher-phase waveform;
   filtering said rectified waveform with a low pass filter with a high cutoff frequency so that high frequencies and noise are filtered out of said waveform, said filtered waveform remaining directly proportional to said input A.C. waveform, said filter being designed so that there is minimum voltage discharge;
   comparing said filtered waveform with a reference waveform and providing an error signal representative of the difference between said filtered waveform and said reference waveform; and
   controlling said three-phase A.C. voltage in said circuit in accordance with said error signal.

10. A method as defined by claim 9 wherein said converting step is performed by section-wound transformers.

* * * * *